United States Patent
Foster et al.

[15] 3,653,220
[45] Apr. 4, 1972

[54] PROCESS FOR HELIUM RECOVERY AND PURIFICATION

[72] Inventors: Kenneth M. Foster, Arlington; Antony Lofredo, Springfield, both of N.J.

[73] Assignee: Airco/Boc Cryogenic Plants Corporation, Murray Hill, N.J.

[22] Filed: May 9, 1969

[21] Appl. No.: 823,363

[52] U.S. Cl. ................................ 62/22, 62/23, 62/39, 62/18, 62/11, 55/75
[51] Int. Cl. ................. F25j 3/00, F25j 3/06, F25t 3/00
[58] Field of Search ................................ 62/13–15, 17–19, 62/22, 23, 30, 39, 40, 26; 55/79, 75

[56] References Cited

UNITED STATES PATENTS

| | | | |
|---|---|---|---|
| 3,407,614 | 10/1968 | Poska | 62/23 |
| 3,507,127 | 4/1970 | De Marco | 62/23 |
| 3,257,773 | 6/1966 | Connors | 55/75 |
| 3,254,496 | 6/1966 | Roche | 62/15 |
| 3,331,213 | 7/1967 | Harmens | 62/18 |
| 3,360,944 | 1/1968 | Knapp | 62/18 |
| 3,415,069 | 12/1969 | Hauser | 62/40 |

OTHER PUBLICATIONS

Garwin, Leo; A Look at Helium– Present and Future, pp. 97–100 Hydrocarbon Processing April, 1962.

*Primary Examiner*—Norman Yudkoff
*Assistant Examiner*—Arthur F. Purcell
*Attorney*—Francis B. Henry, Edmund W. Bopp and H. Hume Mathews

[57] ABSTRACT

Process for recovering helium from natural gas having a well-head pressure in excess of 1,000 psig, comprising steps of: initially drying raw well gas by dry waste gas derived from the process, removing by adsorption in molecular sieves carbon dioxide ($CO_2$) from the gas, cooling the gas in sequential stages for liquefying the removing hydrocarbons and nitrogen, using cyclicly the resulting $CO_2$-free waste gas for the initial drying and for purging $CO_2$ from the molecular sieves respectively, compressing the remaining helium-rich gas to approximately 2,800 psig and cooling by liquid nitrogen for liquefying and removing the remaining nitrogen, and passing the concentrated helium through a cryogenic charcoal purifier for subsequent storage.

12 Claims, 3 Drawing Figures

INVENTORS
KENNETH M. FOSTER
ANTONY LOFREDO
BY
F B Henry
ATTORNEY 3,653,220

PROCESS FOR HELIUM RECOVERY AND PURIFICATION

BACKGROUND OF THE INVENTION

This invention relates to selective separation and removal of components of a gaseous mixture for isolation and recovery of a desired component, and in particular to the recovery from certain natural gases of helium in essentially pure form.

The helium content of natural gas is comparatively small, ranging from 1 percent or less, to about 4 percent by volume in most instances, and sometimes reaching higher percentages, depending on the geographical location of the well. Commercial production of helium consists essentially of extracting this element from helium-rich natural gas by selective removal, usually in distinct stages in the liquefaction order of all the other components comprising mainly carbon dioxide, water, volatile and heavy hydrocarbons, nitrogen and minor impurities. The remaining gas so isolated consisting of practically pure helium, is stored at high pressure for future use.

Various processes including the use of large cooling towers, gas scrubbers, multiple flash columns, chemical reaction and precipitation, and other techniques, have been used and proposed for the selective removal of the unwanted components, that together constitute more than 90 percent of the raw well gas. Insofar as is presently known, all the helium production plants prior to this invention used gas treating processes and separating techniques of varying complexity that in general required massive units, towers, etc., of considerable size occupying very large amounts of plant space. Such plants are very expensive as regards not only the original cost but also operating costs due to extensive supervision and maintenance requirements, and are economically limited to fixed field locations where helium-rich natural gas production is large and comparatively stable, together with expected high yield over a number of years. A typical prior art installation is the helium production plant operated by the U.S. Bureau of Mines at Keys, Oklahoma, described in "Chemical Engineering" for July 25, 1960, pp. 96 et seq.

SUMMARY OF THE INVENTION

In practicing the helium recovery process of the invention, helium bearing natural gas preferably with helium content of at least 3 percent by volume and at well-head pressure preferably in excess of 1,000 psig, is initially dried, principally in a compact high pressure dryer with molecular sieves, that uses moisture-free waste gas from the recovery process. The dry gas is then passed through adsorbers also using molecular sieves for removing carbon dioxide, $CO_2$. The gas now free of liquids and $CO_2$, is passed through a first heat exchanger cooled by waste gas for condensing and separating out heavy hydrocarbons; the uncondensed gas is then passed through a second or main, heat exchanger using an economical combination of both cold waste gas and liquid nitrogen for cooling the gas to at least −310° F., thereby condensing and separating practically all the hydrocarbons remaining in the gas, as well as part of the nitrogen. The cold uncondensed gas is warmed by recirculation through a warming pass of the main exchanger to ambient temperature.

After warming in the main exchanger as described above, the uncondensed gas now in a form generally described as "crude helium", is compressed to approximately 2,800 psig. and then passed through a third heat exchanger cooled by liquid nitrogen for condensation, separation and removal of nitrogen and all but traces of remaining impurities. The $CO_2$-free waste gases resulting from condensation procedures above, are advantageously used for cyclicly reprocessing both the high pressure dryers and the $CO_2$ adsorbing molecular sieves. The uncondensed gas constituting nearly pure helium, is passed through cryogenic charcoal adsorbers for final purification and storage.

A principal object of the invention, therefore, is to provide an improved, simplified and economical process and apparatus requiring minimal plant equipment and supervision for the recovery of helium from helium-bearing natural gas.

Another object is to provide improved, compact and efficient preliminary gas treating equipment especially adapted for small plant installations for separating and removing liquids and carbon dioxide from raw well gas.

Another object is to provide in a helium recovery process an improved, economical simplified moisture and $CO_2$ gas separating system utilizing $CO_2$-free waste gases derived from the process for cyclic renewal of drying and $CO_2$ separation units.

Another and related object is to provide an improved helium production plant of compact size wherein the gas processing units and equipment readily lend themselves to mobile installations for plant relocation.

Other objects, features and advantages will appear from the following description with reference to the accompanying drawings.

DESCRIPTION OF THE PREFERRED EMBODIMENTS

Figure 1:
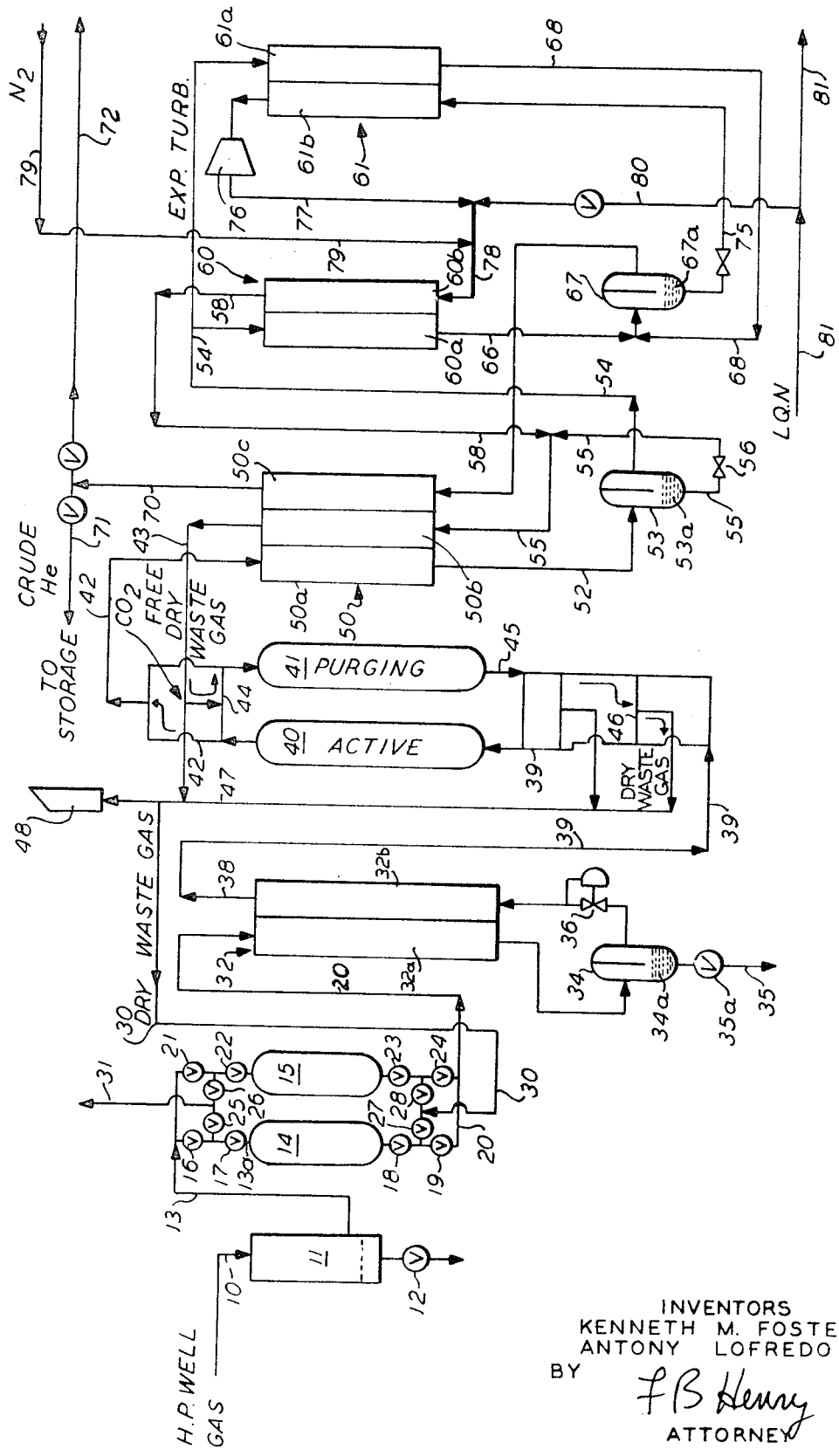
FIG. 1 is a partly schematic flow-type system diagram illustrating the first stage of the helium recovery process of the invention for producing crude helium.
Figure 2:
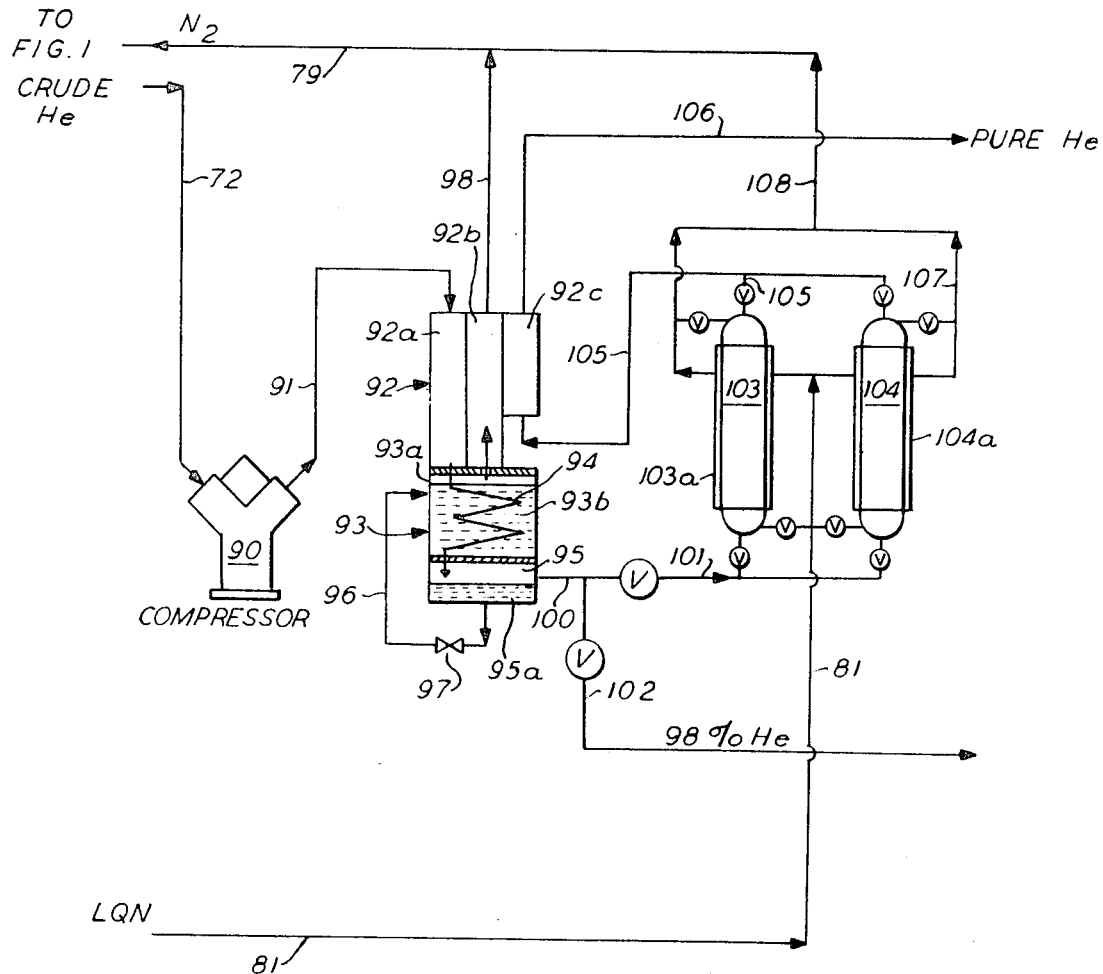
FIG. 2 is a similar type diagram illustrating the complementary final stage of the process for producing purified product helium.
Figure 3:
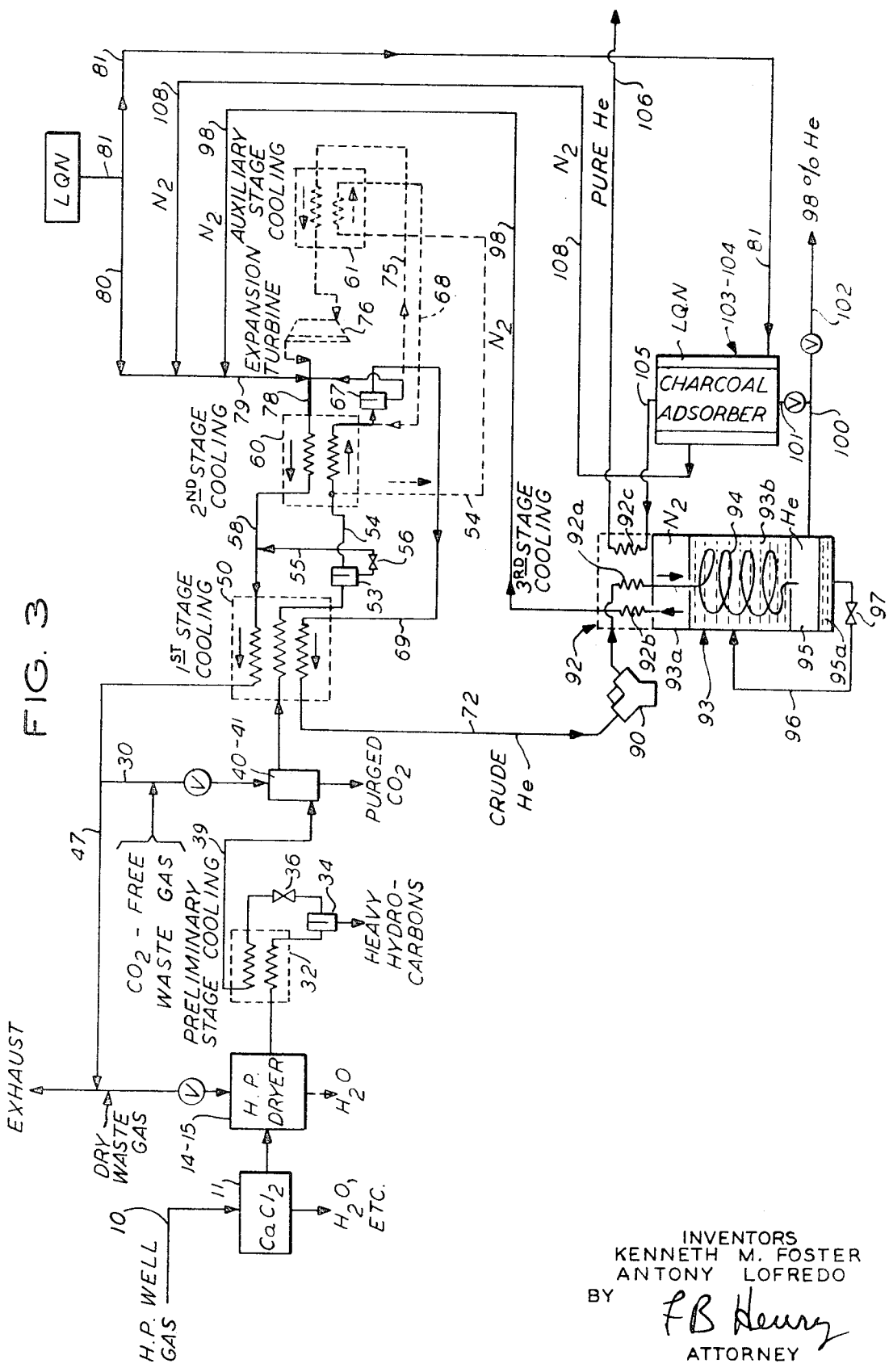
FIG. 3 is a flow-type simplified diagram generally illustrating the complete recovery process of FIGS. 1 and 2.

A helium production plant for the process of FIGS. 1 to 3 receives raw natural gas from a well-head through a gas line 10. For the well-head example given, the composition of the gaseous mixture is approximately 22% $CO_2$, 15% $CH_4$, 54% N and 6½% He, the remainder consisting of small amounts of hydrocarbons of the methane series, water vapor, unvaporized hydrocarbons and various impurities. The pressure at well-head for the installation in question is about 1,500 psig although the invention process is operable at a well-head pressure as low as 150–200 psig. In practicing the invention, the suspended liquids and part of the water vapor are initially separated and removed at the well-head by passage of the gas through a preliminary drying unit 11 containing calcium chloride, $CaCl_2$. The liquids so separated from the gas stream, i.e. water, $CaCl_2$ brine, easily condensed hydrocarbons, etc., settle at the bottom of the unit and are periodically drawn off by suitable means such as a manual or automatic valve indicated at 12 that operates in known manner for maintaining a constant liquid level and seal at the bottom of the unit.

The partially dried gas after passing through the unit 11 flows through line 13 to one of a pair of high pressure dryers 14 and 15 for practically complete removal of moisture. The dryers are schematically shown in a symmetrical arrangement for continuous operation by alternate use. It will be assumed that the dryer 14 is in operation and that the alternate unit 15 is for the time being, out of service for processing in preparation for its next drying operation. Accordingly, the inlet valves at 16 and 17, and the outlet valves at 18 and 19 for unit 14 are open for directing gas flow from the line 13 to the unit intake 13a, through the unit and to the outlet line at 20. Coincidentally, for isolating the inactive unit 15 during the operation of unit 14, the inlet valve 21 and outlet valve 24 of unit 15 communicating with the main lines 13 and 20 are closed, as are also the isolating valves 25 and 27.

The drying medium for renewing or reprocessing a respective drying unit during its "off" cycle, is advantageously, dry waste gas derived as hereinafter described from the recovery process. This waste gas is fed by line 30 to an inlet manifold including isolation valves 27 and 28 for selective direction of the drying gas to the dryers. An exhaust manifold including the isolation valves 25 and 26 selectively directs the moisture-laden exhaust to atmosphere at 31, depending on the unit that is being processed for a subsequent drying cycle. The high pressure adsorption dryers are of the type commercially known as "heatless dryers", well known examples being the "-

Kemp" dryer and "Pittsburg Electric Dryer". Such dryer units can be operated from 12 to 24 hours without processing.

The moisture-free gas from the dryer in line 20, still at practically well-head pressure, flows through a two-pass heat exchanger 32 for preliminary cooling and condensation of part of the more easily condensed heavy hydrocarbons. The gas is cooled in pass 32a to nearly −40° F. and passed through a separator 34 wherein liquefied heavy hydrocarbons are collected at 34a and drawn off through a liquid seal valve 35a in discharge line 35. The uncondensed gas still at high pressure, flows from the separator 34 and through a refrigeration-type expansion valve 36, such as the well-known Joule-Thompson valve for example, to the cold pass 32b of the exchanger; the gas has now been reduced in pressure to about 150 psig. and in temperature to −40° F. for extracting heat from the incoming gas in pass 32a, as mentioned above.

In certain installations, the heat exchanger 32 may be omitted or bypassed, depending on the amount of heavy hydrocarbons to be removed. In either event, the gas is directed through a line 39 leading to one of a pair of $CO_2$ adsorbers 40 and 41 that are connected for cycling or alternate use, generally in the manner of the high pressure dryers 14 and 15. The adsorbers contain molecular sieves of a type known commercially as "13X" or "4A", consisting of pellets of crystalline metal alumino-silicate that remove only the $CO_2$ component of the gas. Each adsorber is operated in turn for approximately 7 ½ minutes, while the alternate unit is reactivated by first depressurizing to atmosphere and then flushing at ambient temperature with $CO_2$-free dry waste gas derived from a later stage of the process.

As automatic or manually controlled cycling of dual units in alternate operation is common and well known practice for maintaining continuous production, it will be sufficient to illustrate the essential inlet and outlet manifolds for the $CO_2$ adsorbers for indicating obvious operation. Accordingly, a detail description and illustration of the isolation valving, etc., and transfer lines for such alternate operation is deemed unnecessary for a complete understanding of the invention.

Assuming that the adsorber unit 40 is in operation and that the inactive adsorber 41 is being reactivated, the incoming dry gas from the line 39 is at about 150 psig as it enters the adsorber 40. During passage of the gas through the molecular sieves, the $CO_2$ is retained in the sieves by adsorption in known manner, so that the outgoing gas in line 42 is, except for minute traces, now free of $CO_2$. After a brief operating period, depending on the $CO_2$ content of the gas, etc., the molecular sieves require reactivating by a suitable gas for removing the adsorbed $CO_2$. According to the invention, the purging $CO_2$-free dry waste gas at ambient temperature that is subsequently derived from liquefied hydrocarbons and nitrogen vapor is found to be an efficient and economical flushing medium for the adsorbers, as well as a means for simplifying plant equipment. The $CO_2$-free waste gas is fed by line 43 to a properly valved manifold generally indicated at 44 for flushing the adsorber 41. The dry $CO_2$-bearing gas from the adsorber outlet 45 is fed through a properly valved manifold at 46, to a waste line 47 (connected to the dryer line 30) and through a muffler 48 to atmosphere.

The alternate use of the adsorber 41 for $CO_2$ removal while the molecular sieves of unit 40 are being reactivated will now be apparent from inspection and reference to FIG. 1. In passing, dry waste gas for line 30 supplying the high pressure dryers 14 and 15 can conveniently be taken in part from exhaust line 47 as indicated.

From the $CO_2$ adsorbers, the gas at about 140 psig is directed by line 42 to a main three-pass heat exchanger 50 where it is further cooled in pass 50a for condensing the remaining heavy hydrocarbons and some methane, $CH_4$. The chilled $CO_2$-free gaseous mixture coming from pass 50a is directed by line 52 to a separator 53 where the liquefied component is separated and collects at 53a. Meanwhile, the uncondensed gas flows from the separator through line 54 for further cooling and processing as presently described. The cold liquefied waste gas at about 140 psig is drawn from the lower part 53a of the separator through the outlet line 55 and to the expansion valve 56 that in turn reduces the vapor pressure to about 5 psig and further lowers the temperature; accordingly, the cold hydrocarbon gas (augmented by additional cold waste gases from line 58) flowing from line 55 through the cooling pass 50b of the heat exchanger 50 extracts heat from the incoming gas in pass 50a for condensing hydrocarbon vapors therein as mentioned above. The waste exhaust gas from pass 50b, now warmed to about ambient temperature, is directed by line 43 to the main waste exhaust line 47 described above.

Returning to the helium recovery gas separation process, the cold uncondensed gas flowing from separator 53 through line 54 is further cooled by passage in divided flow through the heat exchangers 60 and 61, respectively. That part of the gas flowing through pass 60a of the exchanger 60 is cooled to about −310° F. by a cold gaseous mixture of nitrogen and waste gases in the counter-flow cold pass 60b. The other part of the gas in line 54 flows through the exchanger 61 where it is also cooled in pass 61a by cold waste gases, as explained below. Returning to the exchanger 60, the cooled gas from pass 60a wherein some nitrogen and practically all the remaining methane are condensed, is fed by line 66 to the separator 67 where the condensate is separated from the uncondensed gas and collected at 67a. This separator also receives other condensate from the line 68 connected to the outlet of pass 61a, exchanger 61.

That part of the gas stream in line 54 diverted to exchanger 61 is sufficiently cooled in pass 61a for condensing the remaining methane and some nitrogen, by cold waste gas constituting vaporized condensate from separator 67. To this end, an expansion turbine 76 is connected to the outlet of the cooling pass 61b for reducing the pressure from about 150 psig to 5 psig. The cold condensate at 67a therefore, as it is drawn through its drain line 75 leading to pass 61b, is vaporized and reduced in temperature. The resulting cold low-pressure gas from the turbine, line 77, is combined in a trunk line 78 with cold nitrogen gas from line 79 (derived from the final helium purification process, FIG. 2), and with make-up cold nitrogen from line 80. The latter can be manually or automatically added in known manner, for example, according to the temperature at the output of exchanger pass 60a. The make-up nitrogen is conveniently and economically obtained from a stand-by storage source of liquid nitrogen, LQN, FIG. 3, represented also by the supply line 81, FIGS. 1 and 2.

The composite cold gas supply now combined in trunk line 78 supplies the cooling pass 60b of exchanger 60 that is in counter-flow relation to the incoming gas in pass 60a as mentioned above. The cold waste gas from the outlet line 58 of pass 60b is also economically used as previously described, for the cooling pass 50b of the three-pass exchanger 50 from which it is discharged with much higher heat content through line 43. As described above, the line 43 supplies dry waste gas for cyclic purging of the $CO_2$ adsorbers 40 and 41, and also drying gas by line 30 for the high pressure dryers 14 and 15. The remaining waste gas is discharged to atmosphere through the exhaust muffler 48.

For completing the preliminary process of helium recovery described with reference to FIG. 1, the cold uncondensed gas from the separator 67 in line 69 representing the combined output of the heat exchangers 60 and 61, is recirculated through the exchanger 50 in pass 50c where it is warmed to about ambient temperature by being in heat transfer relation with the incoming gas at about ambient temperature in pass 50a. It is now apparent that for practical purposes, the invention makes optimum use in the heat transfer process of the cold uncondensed gas, as well as the cold waste gases derived from heat exchanger condensate. This, in turn, simplifies and materially reduces the amount of equipment ordinarily used for helium recovery.

The gas now has about 80 to 85 percent helium content, with the remainder consisting mainly of nitrogen and small amounts or traces of hydrocarbons and various impurities. At this concentration of helium, the gas is commercially known as "crude helium" and is sometimes stored as such for final purification at a later time. To this end, the crude helium gas from pass 50c in line 70, is selectively directed through one of the valve controlled branch lines 71 or 72 for either storage or for further processing for obtaining pure helium, as the case may be.

The final purification of crude helium obtained from the output line 72, FIG. 1, will be described with reference to the complementary equipment of FIG. 2. The crude helium at ambient temperature from line 72 is first compressed to about 2,800 psig by a high pressure compressor 90 such as that of the known "Corblin" high pressure diaphragm type, and then fed through the high pressure line 91 to a combined low temperature heat exchanger 92 and a condenser and separator unit 93. In the heat exchanger 92, the incoming high pressure helium-rich gas in pass 92a is in heat transfer relation with pass 92b through which flows cold nitrogen vapor from the compartment 93a of the unit 93. The compartment contains a body of low pressure liquid nitrogen 93b in which a condenser coil 94 is immersed, the coil being connected at its upper end to the outlet of pass 92a and its lower end feeding into an enclosed gas-liquid separating compartment 95. A line 96 including a valve 97 for liquid level control interconnects the compartments 95 and 93 as shown. The cold nitrogen vapor in the upper part of compartment 93a is fed into the cold heat transfer pass 92b as mentioned above.

The functioning of the condenser and separator unit 93 in removing the remaining nitrogen and other impurities in the crude helium will be apparent from the description above. In brief, the incoming high pressure gas with comparatively high heat content is materially cooled in pass 92a due to high rate of heat transfer to the cold nitrogen in pass 92b. As the initially cooled gas flows from pass 92a through the nitrogen cooled condenser coil 94, heat transfer is practically stabilized at about $-320°$ F. At this temperature, all the remaining nitrogen in the crude helium is condensed and drains from the coil into the high pressure separator 95 together with the uncondensed gas, where it is separated from the gas and collects as liquid nitrogen at 95a. As the separator pressure is maintained at about the compressor output pressure, i.e. 2,800 psig, the condensed nitrogen at 95a lends itself to efficient refrigeration of the compartment 93a. To this end, the outlet valve 97 that also functions as an expansion valve, reduces the nitrogen pressure in line 96 at its output (leading to compartment 93a) to about 5 psig., thereby reducing the temperature to about $-320°$ F. in compartment 93a. This cold nitrogen in addition to cooling the incoming crude helium and refrigerating the coil 94, also supplements the supply of heat transfer cooling gas fed by lines 98, 79 and 78, to the cold pass 60b of the low temperature heat exchanger 60, FIG. 1; this supplement depends on the output of the expansion valve 97 that in turn depends on the liquefied nitrogen collected in the separator 95.

The gas remaining in the space above the liquid nitrogen in the separator chamber 95 consists of approximately 98 percent pure helium and is piped at 100 from the separator to line 101 for final purification, or to line 102 for commercial use, as the case may be. Where a high degree of purity is required, the helium in line 101 is fed to one of a pair of alternately operated high pressure, adsorbers 103 and 104 containing activated charcoal. The adsorbers are cooled for operating at cryogenic temperatures by liquid nitrogen LQN piped from the source line 81 to annular chambers 103a and 104a that jacket the adsorber units as indicated. The jacket outlets feed cold nitrogen by line 108 to the cold trunk line 78 for use in the exchanger 60 as described above.

Assuming that the adsorber 103 is in use and that the unit 104 meanwhile is being cleaned, the helium during its passage through the cold, pressurized charcoal is freed for all practical purposes of impurities, so that the output in line 105 may be considered pure helium. As pressurized stored helium is generally at ambient temperature, the cold helium ready for storage can be usefully piped through a heat exchanger pass 92c that is in heat transfer relation with the incoming warm gas in pass 92a of unit 92, FIG. 3, and then piped through the line 106 to storage.

The cleaning of the adsorbers 103 and 104 is done in conventional manner by cyclic flushing with cold fresh nitrogen from the storage source line 81. The impurities adsorbed by the charcoal are picked up by the nitrogen, that in turn is piped by lines 107 and 108 to the cold nitrogen line 79, and subsequently handled as waste gas as previously described. Accordingly, the flushing nitrogen has an additional function, i.e. providing cold make-up nitrogen for the heat exchangers of FIG. 1. The cycling control for alternate use and cleaning of the adsorbers follows well known manual or automatic procedures mentioned above.

Referring to FIG. 3 in particular, wherein the system disclosure is condensed and simplified by omitting alternate units for cyclic processing and by illustrating heat exchangers, etc., diagrammatically, the invention process can be modified where advantageous by eliminating the last heat exchanger 61 (FIG. 1) and the related expansion turbine 76 as indicated by the dotted line illustration thereof. In this simplified version, all the uncondensed gas from the exchanger 50 passes through the exchanger 60, rather than in divided flow as indicated in dotted lines. The refrigeration deficit is made up simply by adding sufficient storage LQN to the trunk line 78.

Optimum and economical use is made of both the condensed waste gases and the separated uncondensed gases produced in the intermediate heat transfer stages of the process invention. Accordingly, the refrigeration deficit inherent in a closed system is minimized that, in turn, reduces to a practical minimum the cryogenic liquid nitrogen required from the storage line 81 for make-up.

The final disposal of the separated methane and heavy hydrocarbons depends on economic factors; they can either be vented to atmosphere as waste or stored as preferred. The unheated waste nitrogen and other gases used in washing the $CO_2$ adsorbers can be blown to atmosphere along with the desorbed $CO_2$.

An economic factor closely related to the optimum use of equipment is that the invention lends itself to comparatively small and compact heat exchanger units, dryers, adsorbers, and related equipment, in contrast to large permanent installations involving scrubbing and flash towers, etc., used in previous plants. In practice, it has been found that a small and efficient helium recovery plant constructed in accordance with the invention can be assembled as several small units, each on a movable base or skid for normal truck transportation to a gas well site. The invention, therefore, has special application to helium recovery from ordinarily inaccessible wells where a large helium production plant tied in with a gas transmission pipe line is impractical, and especially to helium recovery from remote locations where but a single well exists.

In using the process of the invention it will be understood that routine steps in the handling of gases and condensates for heat transfer, separator drainage, valving, etc., at different pressures and temperatures, can follow well known practice; a detailed disclosure of the specific equipment, so used, is therefore omitted in the interest of clarity and brevity.

Having set forth the invention in what is considered to be the best embodiment thereof, it will be understood that changes may be made in the system and apparatus as above set forth without departing from the spirit of the invention or exceeding the scope thereof as defined in the following claims.

We claim:

1. A process for recovering helium in substantially pure state from helium-bearing natural gas comprising the steps;
   a. initially removing suspended liquids, drying the gas under pressure and removing by molecular sieve adsorption carbon dioxide from the dry gas in preparation for low temperature cooling;

b. cooling in a first stage the dry and purified gas by heat transfer to a cold gaseous medium for condensing a major part of the heavy hydrocarbons in the gas, and separating the uncondensed gas from the condensate;

c. further cooling in a second stage the uncondensed gas by heat transfer to cold nitrogen vapors at low pressure for condensing remaining hydrocarbons and most of the nitrogen in the gas;

d. separating the uncondensed gas from the second stage in the form of crude helium gas from the condensate;

e. compressing to high pressure the crude helium gas and cooling in a third stage the compressed gas by heat transfer to low pressure liquid nitrogen for condensing from the high pressure crude helium gas practically all the remaining nitrogen vapor and impurities;

f. using the low pressure nitrogen vapor from the third stage as part of the gaseous cooling medium for the first and second stages, and g. separating the remaining high pressure uncondensed gas in the form of nearly pure helium from the condensate.

2. A helium recovery process as specified in claim 1 wherein the gaseous medium also includes cold vapor from the condensate of the first stage cooling.

3. A helium recovery process as specified in claim 1 wherein the dried gas prior to carbon dioxide removal is initially cooled for partial condensation of heavy hydrocarbons, and the uncondensed high pressure gas is expansion-refrigerated for counter-flow cooling of the dried gas.

4. A helium recovery process as specified in claim 1 wherein the uncondensed gas flow from the first cooling stage is divided for diverting part of the gas for further cooling in an additional auxiliary stage by heat transfer to cold low pressure vapor from the condensate of the second cooling stage, and the auxiliary stage waste cold vapor supplements the cold nitrogen vapor from the third stage for cooling the second stage.

5. A process for recovering helium in substantially pure state from helium-bearing natural gas comprising the steps;

a. initially removing suspended liquids and drying the gas under pressure;

b. removing by molecular sieve adsorption carbon dioxide from the dry gas in preparation for low temperature cooling;

c. cooling in a first stage the dry and purified gas by heat transfer to a cold gaseous medium for condensing a major part of the heavy hydrocarbons in the gas, and separating the uncondensed gas from the condensate;

d. further cooling in a second stage the uncondensed gas by heat transfer to cold nitrogen vapors at low pressure for condensing remaining hydrocarbons and most of the nitrogen in the gas;

e. separating the uncondensed gas from the second stage in the form of crude helium gas from the condensate;

f. dividing the uncondensed gas flow from the first cooling stage for diverting part of the gas for further cooling in an auxiliary stage by heat transfer with the condensate of the second cooling stage, the auxiliary stage waste cold vapor supplementing the cold nitrogen vapor for cooling the second stage, the auxiliary stage waste vapor being reduced in pressure and cooled by an expansion turbine;

g. compressing to high pressure the crude helium gas and cooling in a third stage the compressed gas by heat transfer to liquid nitrogen for condensing from the crude helium gas practically all the remaining nitrogen vapor and impurities; and h. separating the remaining uncondensed gas in the form of nearly pure helium from the condensate.

6. A process for recovering helium in substantially pure state from helium-bearing natural gas comprising the steps;

a. initially removing suspended liquids and drying the gas under pressure;

b. removing by molecular sieve adsorption carbon dioxide from the dry gas in preparation for low temperature cooling;

c. cooling in a first stage the dry and purified gas by heat transfer to a cold gaseous medium for condensing a major part of the heavy hydrocarbons in the gas, and separating the uncondensed gas from the condensate;

d. further cooling in a second stage the uncondensed gas by heat transfer to liquid nitrogen and cold nitrogen vapors at low pressure for condensing remaining hydrocarbons and most of the nitrogen in the gas;

e. separating the uncondensed gas from the second stage in the form of crude helium gas from the condensate, the crude helium gas from the second stage cooling being warmed by heat transfer in the first stage cooling;

f. compressing to high pressure the crude helium gas and cooling in a third stage the compressed gas by heat transfer to liquid nitrogen for condensing from the crude helium gas practically all the remaining nitrogen vapor and impurities; and g. separating the remaining uncondensed gas in the form of nearly pure helium from the condensate.

7. A process for recovering helium in substantially pure state from helium-bearing natural gas comprising the steps;

a. initially removing suspended liquids and drying the gas under pressure;

b. removing by molecular sieve adsorption carbon dioxide from the dry gas in preparation for low temperature cooling;

c. cooling in a first stage the dry and purified gas by heat transfer to a cold gaseous medium for condensing a major part of the heavy hydrocarbons in the gas, and separating the uncondensed gas from the condensate;

d. further cooling in a second stage the uncondensed gas by heat transfer to cold nitrogen vapors at low pressure for condensing remaining hydrocarbons and most of the nitrogen in the gas;

e. separating the uncondensed gas from the second stage in the form of crude helium gas from the condensate;

f. compressing to high pressure the crude helium gas and cooling in a third stage the compressed gas by heat transfer for condensing from the crude helium gas practically all the remaining nitrogen vapor and impurities, the compressed helium gas being sequentially cooled in the third stage by respective heat transfer to low pressure nitrogen vapor and liquid nitrogen, and g. separating the remaining uncondensed gas in the form of nearly pure helium from the condensate.

8. A helium recovery process as specified in claim 7 wherein the nitrogen condensate is reduced in pressure and recirculated to constitute the low pressure cooling liquid nitrogen, and the uncondensed gas is recovered as nearly pure helium.

9. Apparatus for recovering helium in substantially pure state from helium-bearing natural gas at well head pressure comprising:

a. drying means for continuously removing moisture from the gas at said well head pressure and adsorption means for continuously removing carbon dioxide from the day gas;

b. a first heat transfer means for cooling the dry and purified gas and condensing a major part of the heavy hydrocarbons and means for separating the uncondensed gas from the condensate;

c. a second heat transfer means for further cooling the separated uncondensed gas for condensing remaining hydrocarbons and some of the nitrogen therein and means for separating from the condensate the remaining uncondensed gas as crude helium gas;

d. a compressor for raising to high pressure the crude helium gas;

e. a third heat transfer means including a first compartment containing liquid nitrogen at comparatively low pressure through which the high pressure crude helium gas is passed in heat transfer relation for condensing in a high pressure compartment the remaining nitrogen in the gas;

f. expansion means for transferring nitrogen condensate into the low pressure compartment, means for returning the nitrogen vaporized in said third heat transfer means through said first and second heat transfer means as part of the cooling medium therein and g. means for separating from the nitrogen condensate in the high pressure compartment the uncondensed gas as nearly pure helium.

10. Apparatus as specified in claim 9 wherein the crude helium gas from the compressor is first directed through a passage in heat transfer relation with the nitrogen vapor from the low pressure compartment.

11. Apparatus as specified in claim 9 wherein the first heat transfer means is a multiple-pass exchanger with at least two streams in counterflow with the dry gas, one stream constituting crude helium from the second heat transfer means, and another stream constituting the cooling stream of the second heat transfer means combined with vapor from the heavy hydrocarbons condensate.

12. Apparatus as specified in claim 11 wherein the cooling stream of the second heat transfer means constitutes vapor from the low pressure nitrogen chamber combined with vapor from the hydrocarbons-nitrogen condensate.

* * * * *